(No Model.)
H. LUBKER.
GUARD FINGER FOR MOWERS AND REAPERS.
No. 383,473. Patented May 29, 1888.
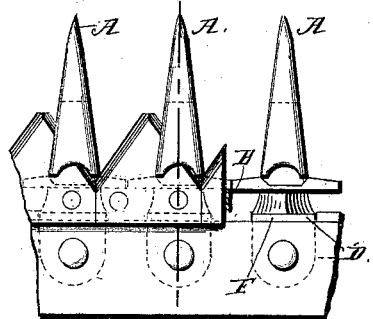
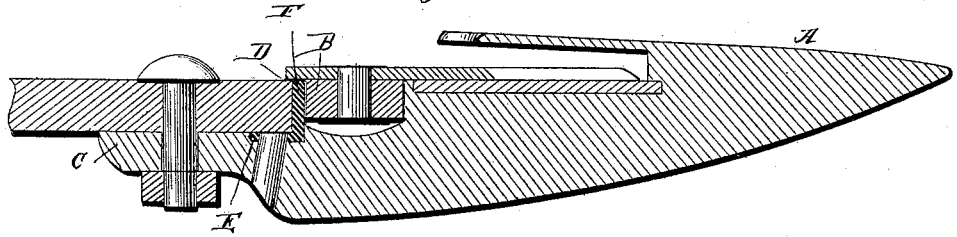
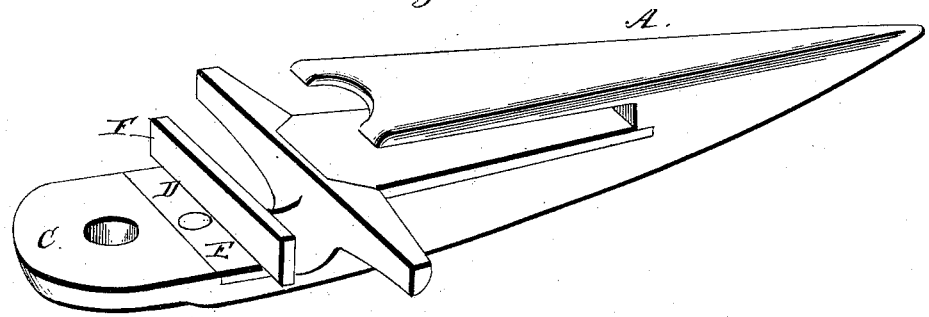
Witnesses.
Geo Thorpe
John H. Biggers
Inventor,
Henry Lubker
By his Attorneys,

UNITED STATES PATENT OFFICE.

HENRY LUBKER, OF COLUMBUS, NEBRASKA.

GUARD-FINGER FOR MOWERS AND REAPERS.

SPECIFICATION forming part of Letters Patent No. 383,473, dated May 29, 1888.

Application filed January 14, 1888. Serial No. 260,697. (No model.)

*To all whom it may concern:*

Be it known that I, HENRY LUBKER, a citizen of the United States, residing at Columbus, in the county of Platte and State of Nebraska, have invented a new and useful Improvement in Guard-Fingers for Mowers and Reapers, of which the following is a specification.

My invention relates to improvements in guard-fingers for mowing and reaping-machines; and it consists in a removable wearing-plate secured between the guard-finger and the finger-bar and adapted to receive the wear of the cutter-bar, so as to prevent the wearing away of the parts of the guard-finger, as will be hereinafter first fully described, and then pointed out in the claim.

In ordinary practice the cutter-bar and its attached cutters wear away the rear portion of the guard-finger, thereby allowing the cutter-bar and the cutters to assume an inclined position, throwing the points of the cutter upward, when they will contact with and wear away the upper guard of the finger, consequently increasing the strain upon the cutting devices and decreasing their efficiency. It has heretofore been proposed to overcome this objection by the employment of a wearing-plate adjustably secured to the finger-bar between the guard-fingers by means of a bolt passed through the wearing-plate and the finger-bar. This device, however, is objectionable, for the reason that it necessitates the formation of an opening or hole through the finger-bar between the adjacent guard-fingers, thereby weakening the finger-bar, and also necessitating the employment of additional bolts, thereby increasing the cost of the machine. This previous arrangement was also objectional, for the reason that the wearing-plate being between the guard-fingers partially filled the space or interval between the same, and thereby rendered the cutter-bar liable to clog on account of its inability to work out the dirt and grass collected in said space. It was furthermore objectionable, for the reason that the number of nuts and bolt-heads on the upper surface of the finger-bar was increased and the grass was consequently liable to be caught thereupon, and thereby clogged up the cutting devices and rendered the passage of the machine through the grass difficult.

The object of my invention is to provide a cheap and simple device for receiving the wear of the cutter-bar, which will be free of the objections above pointed out, and this object I accomplish by means of the construction illustrated in the accompanying drawings, and hereinafter described and claimed.

In the drawings referred to, Figure 1 is a plan view of a portion of a cutting apparatus provided with my improvement. Fig. 2 is a vertical section on line $x\ x$, Fig. 1; and Fig. 3 is a perspective view of the guard-finger with the wearing plate attached.

Referring to the drawings by letter, A designates the guard-finger, and B the cutter-bar. The guard-finger has the usual rearward extension, C, through which the fastening-bolt is passed to secure it to the finger-bar in the ordinary manner.

D designates a wearing-plate, which consists of an L-shaped plate having its horizontal flange E resting upon the upper surface of the guard-finger, while its vertical flange F rests against and in front of the front edge of the finger-bar in position to receive the wear of the cutter-bar, as shown in Figs. 1 and 2. It will thus be seen that the wearing-plate will be secured between the rear edge of the cutter-bar and the front edge of the finger-bar and will not take up any of the space between the fingers, nor present any obstructions to the passage of the grass over the finger-bar. When the wearing-plate has been worn away, a new one may be applied without necessitating the employment of a new guard-finger, and at a trifling cost.

The wearing-plate is secured to the guard-finger by a rivet, as shown, so that when the finger is secured to the finger-bar the horizontal flange of the wearing-plate will be between the finger-bar and the finger, and the vertical flange will rest against the front edge of the finger-bar.

The device is very simple and its advantages are obvious from the foregoing description.

Having thus described my invention, what I claim, and desire to secure by Letters Patent, is—

The combination of the guard-finger, the finger-bar, and the L-shaped wearing-plate having its horizontal flange riveted to the upper surface of the guard-finger and arranged between the same and the finger-bar, and having its vertical flange resting against the front edge of the finger-bar, substantially as specified.

In testimony that I claim the foregoing as my own I have hereto affixed my signature in presence of two witnesses.

HENRY LUBKER.

Witnesses:
J. A. TURNER,
M. K. TURNER.